July 3, 1934.  E. D. CLICKNER  1,965,174
FISHING REEL
Filed Dec. 29, 1932
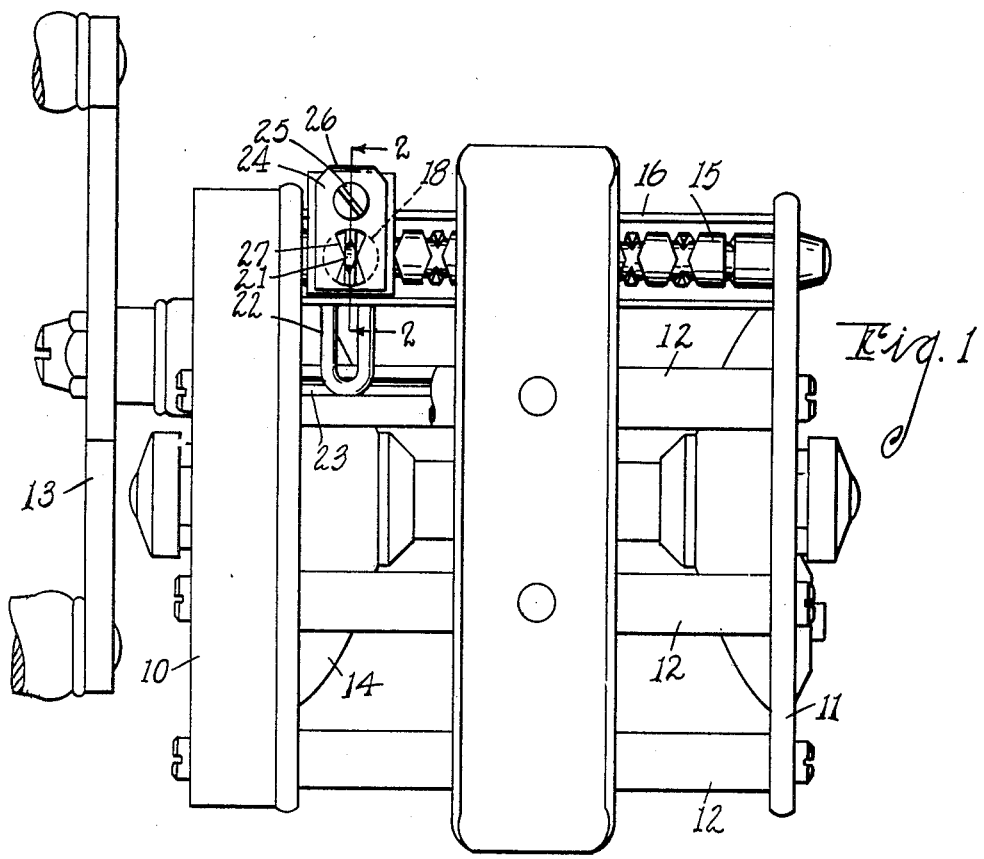
Fig. 1
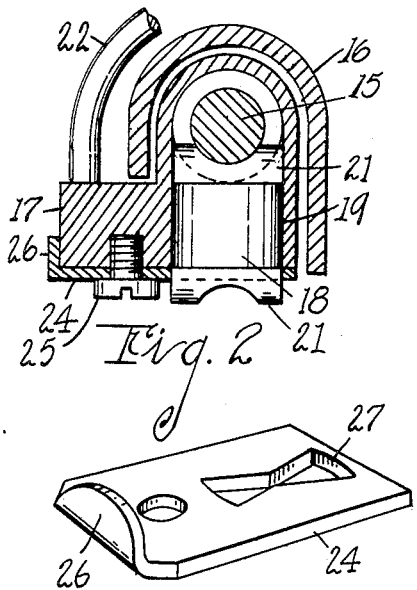
Fig. 2
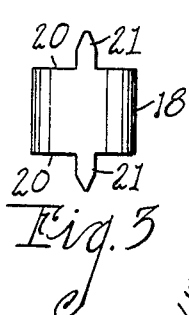
Fig. 3
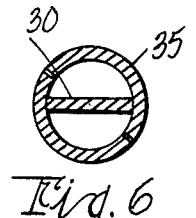
Fig. 6
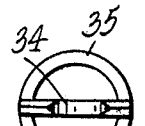
Fig. 5
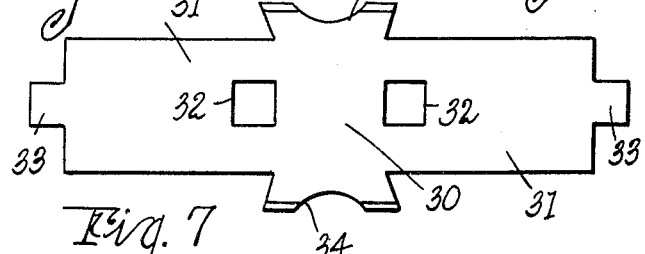
Fig. 4
Fig. 7
INVENTOR
Earle D. Clickner
BY Chappell & Earl
ATTORNEYS Patented July 3, 1934

1,965,174

UNITED STATES PATENT OFFICE 1,965,174

FISHING REEL

Earle D. Clickner, Kalamazoo, Mich., assignor to Shakespeare Company, Kalamazoo, Mich.

Application December 29, 1932, Serial No. 649,279

8 Claims. (Cl. 242—84.4)

The main objects of this invention are:

First, to provide a fishing reel of the level winding type having a carriage with a reversible double-ended pawl in which the pawl is supported so that it is effectively presented to the traversing shaft to coact therewith and at the same time may be conveniently reversed.

Second, to provide a structure of this character in which the parts are very simple and economical to manufacture and assemble.

Objects pertaining to details and economies of my invention will definitely appear from the description to follow. The invention is defined in the claims.

A structure which embodies the features of my invention is clearly illustrated in the accompanying drawing in which:

Fig. 1 is an inverted view of a fishing reel embodying the features of my invention, a portion of the crank being broken away.

Fig. 2 is an enlarged fragmentary view mainly in section on line 2—2 of Fig. 1.

Fig. 3 is an elevation of the reversible pawl.

Fig. 4 is an enlarged perspective view of the pawl retaining clip.

Fig. 5 is an end view of a modified form of pawl.

Fig. 6 is a transverse section of the pawl shown in Fig. 5.

Fig. 7 is a plan view of the blank from which the pawl shown in Figs. 5 and 6 is formed.

Referring to the drawing, the reel frame comprises end members 10 and 11 connected by pillars 12. The crank 13 is connected to the spool 14 by suitable gearing, not shown.

The reversely threaded line guide carriage traversing shaft 15 is also suitably connected to the crank, the gear not being illustrated.

A housing 16 of channel cross section is provided for this shaft.

The line guide carriage 17 is in the embodiment illustrated slidingly or reciprocatingly mounted on the shaft and provided with a pawl 18 disposed in the socket 19 to coact with the threads of the shaft, the socket being in the form of a bore and the pawl having a cylindrical body portion disposed within the socket and shaft-engaging tangs 21 at each end projecting from the flat end portions 20 of the body.

The carriage is provided with a line guide eye 22 projecting upwardly at the side of the housing.

The pawl is retained in cooperating relation to the shaft by means of the clip plate 24 which is detachably secured to the under side of the carriage by means of the screw 25, the clip plate having an upturned end 26 engaging the outer end of the carriage and coacting with the screw in properly positioning the clip plate. The clip has a slot 27 therein adapted to receive the outer tang 21 of the pawl and permit the pawl to oscillate and thereby follow the reverse threads of the traversing shaft.

The carriage is supported against rotative movement on the shaft by means of its line guide eye 22 which engages a groove 23 in one of the frame pillars.

With this arrangement the pawl is supported by the clip plate directly engaging the body portion thereof which allows the pawl to oscillate freely and also relieves the outer traversing shaft engaging portion of any wear. At the same time the pawl can be readily reversed as occasion requires, thereby considerably prolonging the life of the material without materially adding to its cost.

In the embodiment shown in Figs. 5, 6 and 7 the pawl is formed of a sheet metal stamping, the blank from which it is formed comprising a central web-like portion 30 having side wall portions 31 extending from opposite edges thereof. These side wall portions are slotted at 32 to receive the tongues at 33 when the side walls are curved into segmental complementary form to provide the cylindrical body 35. The tangs 34 are extensions of the central web-like portion 30.

These pawls can be readily applied to carriages of a type now quite extensively used, it only being necessary to provide a suitable clip plate or means to support the pawl by engagement with the end of the body portion thereof. The pawl is not only effectively held in position but is very effectively supported to receive the thrust and minimize wear thereon.

The applicant is aware that double pawls have been used in fishing reels to increase or prolong the life and wear thereof, for example, such a pawl is shown as embodied in clicks in the Meisselbach et al. Patent No. 778,368 of December 27, 1904, and also in the Catucci Patent No. 1,637,334 of August 2, 1927. However, applicant's embodiment of double pawl has numerous advantages as indicated.

I have illustrated and described my improvements in embodiments which I have found highly satisfactory. I have not attempted to describe certain embodiments and adaptations which I contemplate to use with other forms of carriages as it is believed that this disclosure will enable those skilled in the art to embody or adapt my invention as may be desired.

Having thus described my invention what I claim as new and desire to secure by Letters Patent is:—

1. The combination with a reel having a reversely threaded line guide carriage traversing shaft, a line guide carriage slidable on said shaft and having a bore-like pawl socket, a reversible pawl disposed in said socket and having a cylindrical socket engaging body portion with shaft engaging tangs at each end, and a plate-like clip releasably secured to said carriage to overlap said socket in supporting engagement with the outer end of the body portion of the pawl and having a slot receiving the outer tang and permitting oscillating movement of the pawl in the socket.

2. The combination with a reel having a reversely threaded line guide carriage traversing shaft, a line guide carriage slidable on said shaft and having a bore-like pawl socket, a reversible pawl disposed in said socket and having a cylindrical socket engaging body portion with shaft engaging tangs at each end, and means releasably secured to said carriage to overlap said socket in supporting engagement with the outer end of the body portion of the pawl and having an opening for the outer tang permitting oscillating movement of the pawl.

3. The combination with a reel having a line guide carriage drive shaft, of a line guide carriage slidably associated therewith and provided with a pawl socket permitting the introduction of the pawl from the outer end of the socket, a double-ended pawl reversible in said socket and having a central body portion with substantially flat ends from which shaft engaging tangs project, and a clip releasably secured to said carriage in supporting engagement with the outer end of the body of the pawl and having an opening receiving the outer tang of the pawl permitting oscillating movement of the pawl in the socket.

4. The combination with a reel having a line guide carriage drive shaft, of a line guide carriage slidably associated therewith and provided with a pawl socket permitting the introduction of the pawl from the outer end of the socket, a double ended pawl reversible in said socket and having a central body portion from which shaft engaging tangs project, and means on said carriage engaging the outer end of the body of the pawl for releasably retaining the pawl in the socket and having an opening receiving the outer tang of the pawl permitting oscillating movement thereof in the socket.

5. The combination with a reel having a reversely threaded line guide carriage traversing shaft, a line guide carriage slidable on said shaft and having a bore-like pawl socket, a reversible pawl disposed in said socket and having a cylindrical socket engaging body portion with shaft engaging tangs at each end, and releasable pawl retaining means in supporting engagement with the outer end of the body portion of the pawl and having an opening for the outer tang permitting oscillating movement of the pawl.

6. The combination in a fishing reel having a line guide carriage traversing shaft, of a drive shaft, a line guide carriage operatively associated therewith and having a pawl socket, a double-ended pawl reversible in said socket and comprising a socket engaging body portion and drive shaft engaging tangs at each end thereof, and means for releasably retaining said pawl in said socket engaging the outer end of the body portion of the pawl and having an opening for the outer tang permitting oscillating movement of the pawl.

7. A pawl member comprising a central web-like portion having integral tangs at the ends thereof and integral semi-cylindrical side portions extending from opposite edges of said central portion to form a cylindrical body, said side portions having slots adjacent said central portion and end tongues engaging said slots.

8. A pawl member comprising a central web-like portion having integral tangs at the ends thereof and integral semi-cylindrical side portions extending from opposite edges of said central portion to form a cylindrical body.

EARLE D. CLICKNER.